United States Patent
Koh et al.

(10) Patent No.: US 9,142,810 B2
(45) Date of Patent: Sep. 22, 2015

(54) RECHARGEABLE BATTERY

(75) Inventors: Seok Koh, Yongin-si (KR); Kyungho Park, Yongin-si (KR); Jeongdeok Byun, Yongin-si (KR); Eunok Kwak, Yongin-si (KR); Pilho Jung, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 291 days.

(21) Appl. No.: 12/882,792

(22) Filed: Sep. 15, 2010

(65) Prior Publication Data

US 2011/0064975 A1 Mar. 17, 2011

Related U.S. Application Data

(63) Continuation-in-part of application No. 12/213,194, filed on Jun. 16, 2008.

(30) Foreign Application Priority Data

Nov. 7, 2007 (KR) .................. 10-2007-0113061

(51) Int. Cl.
*H01M 2/04* (2006.01)
*H01M 2/06* (2006.01)
*H01M 2/20* (2006.01)
*H01M 2/22* (2006.01)
*H01M 2/26* (2006.01)
*H01M 10/42* (2006.01)

(52) U.S. Cl.
CPC .............. *H01M 2/0404* (2013.01); *H01M 2/04* (2013.01); *H01M 2/0473* (2013.01); *H01M 2/06* (2013.01); *H01M 2/20* (2013.01); *H01M 2/22* (2013.01); *H01M 2/26* (2013.01); *H01M 10/425* (2013.01); *H01M 10/4257* (2013.01); *H01M 2010/4271* (2013.01); *H01M 2200/00* (2013.01)

(58) Field of Classification Search
CPC ........... H01M 2/06; H01M 2/22; H01M 2/26; H01M 2/04; H01M 2/0473; H01M 10/425; H01M 10/4257; H01M 2010/425; H01M 2010/4271; H01M 2/0404; H01M 2/20; H01M 2200/00
USPC .............................. 429/7, 161, 175, 178, 179
See application file for complete search history.

(56) References Cited

U.S. PATENT DOCUMENTS

| | | | |
|---|---|---|---|
| 5,977,746 A | 11/1999 | Hershberger et al. | |
| 2003/0082441 A1* | 5/2003 | Hovi et al. | 429/123 |
| 2004/0091769 A1 | 5/2004 | Kawabata et al. | |
| 2005/0153195 A1* | 7/2005 | Han | 429/59 |
| 2005/0208345 A1* | 9/2005 | Yoon et al. | 429/7 |
| 2006/0099492 A1* | 5/2006 | Jeon | 429/61 |
| 2006/0251930 A1 | 11/2006 | Kim | |
| 2006/0263648 A1* | 11/2006 | Park et al. | 429/7 |
| 2008/0102356 A1 | 5/2008 | Choi | |

FOREIGN PATENT DOCUMENTS

| | | |
|---|---|---|
| KR | 10-2005-0077744 | 8/2005 |
| KR | 10-0645256 | 11/2006 |

* cited by examiner

*Primary Examiner* — Eugenia Wang
(74) *Attorney, Agent, or Firm* — Robert E. Bushnell, Esq.

(57) ABSTRACT

In a rechargeable battery, a case is combined with an upper surface of a bare cell by being fixed to a lead plate electrically coupling a protection circuit board of a protection circuit module to the bare cell. Alternatively, the case is combined with the bare cell by being fixed to the protection circuit board so as not to be separated from the bare cell, thereby improving the reliability of the products.

20 Claims, 26 Drawing Sheets

RECHARGEABLE BATTERY

CROSS REFERENCE TO RELATED APPLICATION AND CLAIM OF PRIORITY

This application is a continuation-in-part of U.S. patent application Ser. No. 12/213,194 entitled "Rechargeable Battery" filed in the U.S. Patent and Trademark Office on the 16th of Jun. 2008, which is a parent application of U.S. patent application Ser. No. 12/801,663 filed in the U.S. Patent and Trademark Office on the 18th of Jun. 2010, and assigned to the assignee of the aforesaid applications. Furthermore, this application makes reference to, incorporates the same herein, and claims all benefits accruing under 35 U.S.C. §119, §120 and §121 from an application earlier filed in the Korean Intellectual Property Office on the 7th of Nov. 2007, and thereby duly assigned Serial No. 2007-0113061.

BACKGROUND OF THE INVENTION

1. Technical Field

The present invention relates to a rechargeable battery and, more particularly, to a rechargeable battery which can improve productivity by improving an assembly structure of the battery.

2. Related Art

Generally, a rechargeable battery is a battery which is rechargeable and is different from a disposable battery which is not rechargeable. The rechargeable battery has been widely used in the fields of electronic devices, such as cellular phones, notebook computers and camcorders. Particularly, a lithium rechargeable battery has an operational voltage of 3.6V which is three times higher than that of an Ni—Cd battery or an Ni—H battery, which are frequently used as power sources of electronic devices, and which have high energy density per unit weight. As a result, the lithium-ion battery has developed rapidly in recent years.

The lithium rechargeable battery includes a bare cell and a protection circuit module (PCM) for electrically protecting the operation of the bare cell. The bare cell comprises an electrode assembly including a cathode plate, an anode plate and a separator interposed between them, a can receiving the electrode assembly and an electrolytic solution, and a cap assembly sealing an opening part of the can.

Methods of fixing the protection circuit module to the bare cell include a molding method using injected melted resin and an assembling method using an injection molded case.

The method of fixing the protection circuit module to the bare cell by molding melted resin has a problem in that the high temperature of the melted resin causes undesirable effects on various elements included in the protection circuit module. Furthermore, it is difficult to form a molding resin at an exact position on one surface of the bare cell, thereby increasing defects.

Conversely, the method of fixing the protection circuit module to the bare cell by the injection molded case does not affect the elements of the protection circuit module by hot temperature, and since it is an assembling method using a case, it is always possible to assemble at an exact position of the bare cell. In addition, the assembling process is simple.

However, in the fixing method using the case, the case is fixed to the bare cell by a label sheet surrounding an outer circumference surface of the bare cell. In this regard, the case is fixed to the bare cell by adhesive force of the label sheet, which is a thin film, and thus the binding force of the case attached to the bare cell is very weak. Accordingly, the case is easily twisted from an upper surface of the bare cell or, in an undesirable case, may be separated from the bare cell.

As described above, the conventional case is easily separated from the bare cell because the case is fixed to the bare cell only by the adhesive force of the label sheet. Thus, there is a problem that the reliability of products is prominently damaged.

SUMMARY OF THE INVENTION

Accordingly, an object of the present invention is to provide a rechargeable battery which can strongly fix a case to a bare cell so as not to be separated from the bare cell.

Additional advantages, objects and features of the invention will be set forth, in part, in the following description, and will become apparent, in part, to those having ordinary skill in the art upon examination of the following or may be learned from practice of the invention.

According to an aspect of the present invention, a rechargeable battery comprises: a bare cell; a protection circuit module including a protection circuit board installed in the bare cell; a lead plate installed between the protection circuit board and the bare cell so as to electrically couple the protection circuit board and the bare cell; and a case connected to the bare cell so as to receive the protection circuit module on one surface of the bare cell; wherein at least one projection is formed on the lead plate and a projection fixing part combined with the projection is formed at the case so as to combine the case with the bare cell.

The lead plate may be installed on both ends of an upper surface of a cap plate of the bare cell, and includes a substrate fixing part welded to the protection circuit board, a bare cell fixing part welded to the bare cell, and a connecting part connecting the substrate fixing part to the bare cell fixing part.

The projection may be extended horizontally and outwardly from a side surface of the bare cell fixing part.

The projection may be extended horizontally and outwardly from a side surface of the substrate fixing part.

The projection may be extended horizontally and outwardly from a side surface of the connecting part. The projections of the lead plates may have one side having a round shape.

The lead plate may be fixed by welding the bare cell fixing part to the upper surface of the cap plate.

The cap plate may include an alignment means formed thereon for enabling the bare cell fixing part of the lead plate to be fixed accurately to the cap plate.

The alignment means may be a mark including at least one letter or at least one symbol formed on the upper surface of the cap plate.

The alignment means may be at least one protrusion formed on the upper surface of the cap plate.

The protrusion may be a plurality of dots.

The protrusion may have a shape which is the substantial same as that of the bare cell fixing part.

The alignment means may be a recess formed on the upper surface of the cap plate, and wherein the recess has a shape such that the bare cell fixing part may be received in the recess.

The projection fixing part of the case may be formed in the shape of a hole or a groove.

The case may include a sleeve covering an outer circumferential surface of an upper periphery of the bare cell, the sleeve being extended from a lower end part.

A label sheet may be attached to a side surface of the bare cell so as to cover the sleeve of the case.

The case may include a sleeve covering an outer circumferential surface of an upper periphery of the bare cell, the sleeve being extended from a lower end part, and the projection fixing part may be formed on the sleeve.

The projection fixing part combined with the projection may be formed at the case so as to combine the case with the bare cell.

According to another aspect of the present invention, a rechargeable battery comprises: a bare cell; a protection circuit module including a protection circuit board installed in the bare cell; and an upper case connected to the bare cell while receiving the protection circuit module on one surface of the bare cell; wherein at least one projection is formed on the protection circuit board, and a projection fixing part combined with the projection is formed at the case so as to hold the case by means of the bare cell.

The projection of the protection circuit board is projected horizontally and outwardly from a side surface of the protection circuit board.

The projection fixing part of the upper case may be formed in the shape of a hole or a groove.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

Figure 1:
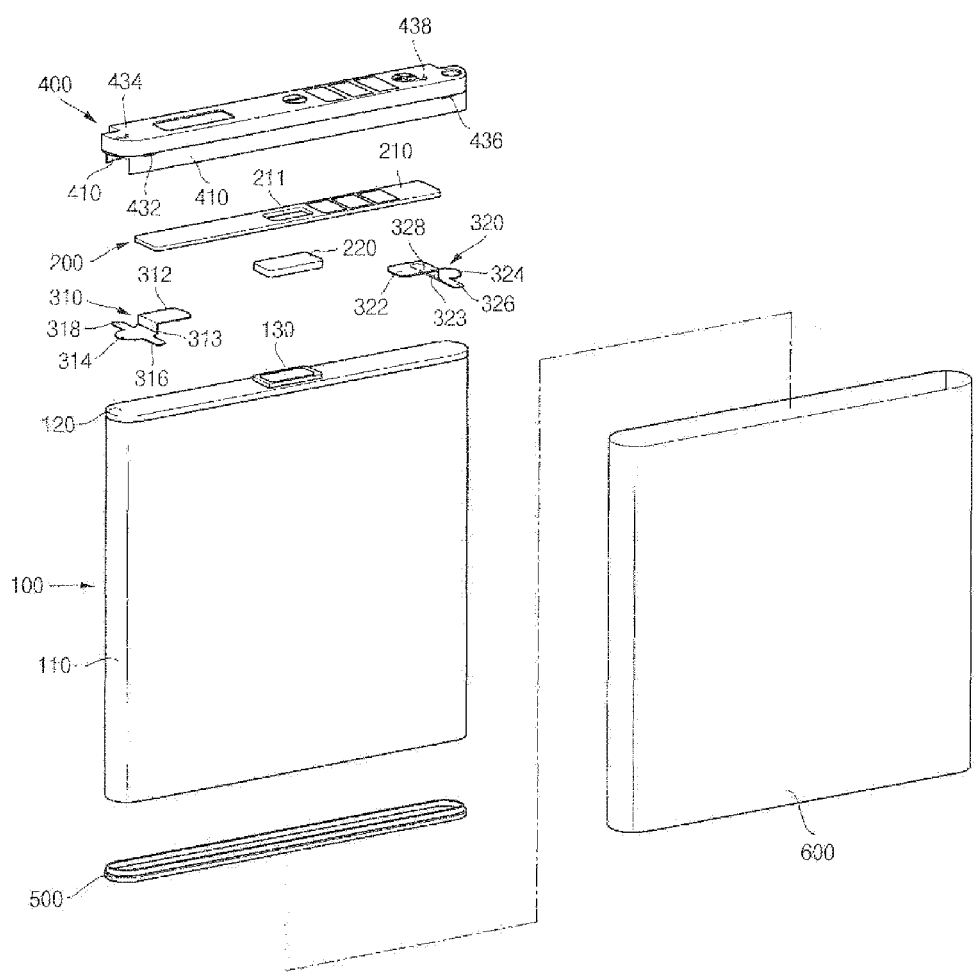
FIG. 1 is an exploded perspective view of a rechargeable battery according to a first exemplary embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
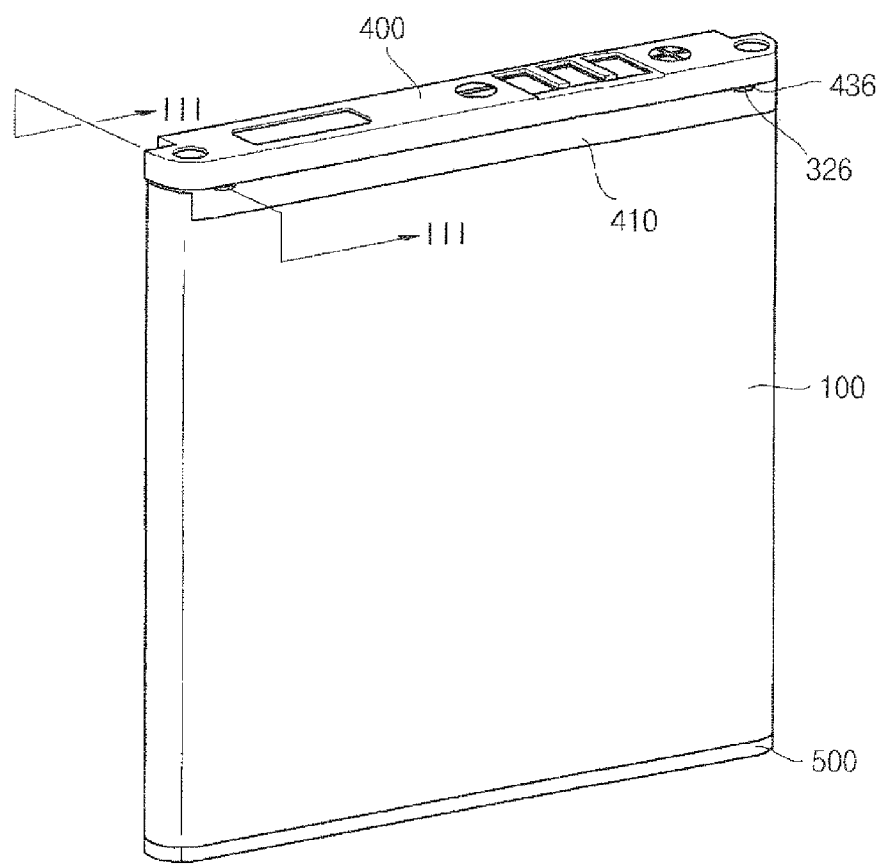
FIG. 2 is a perspective view of a state wherein an upper case of the rechargeable battery according to the first exemplary embodiment of the present invention is combined.
Figure 3:
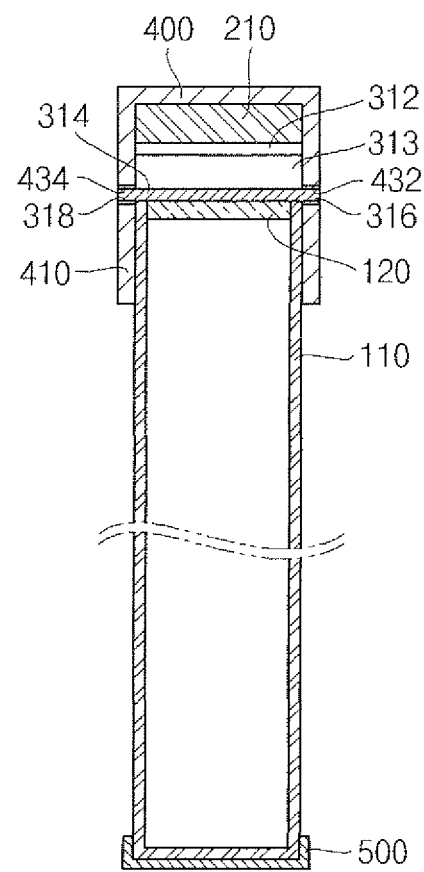
FIG. 3 is a sectional view taken along line of FIG. 2.
Figure 4:
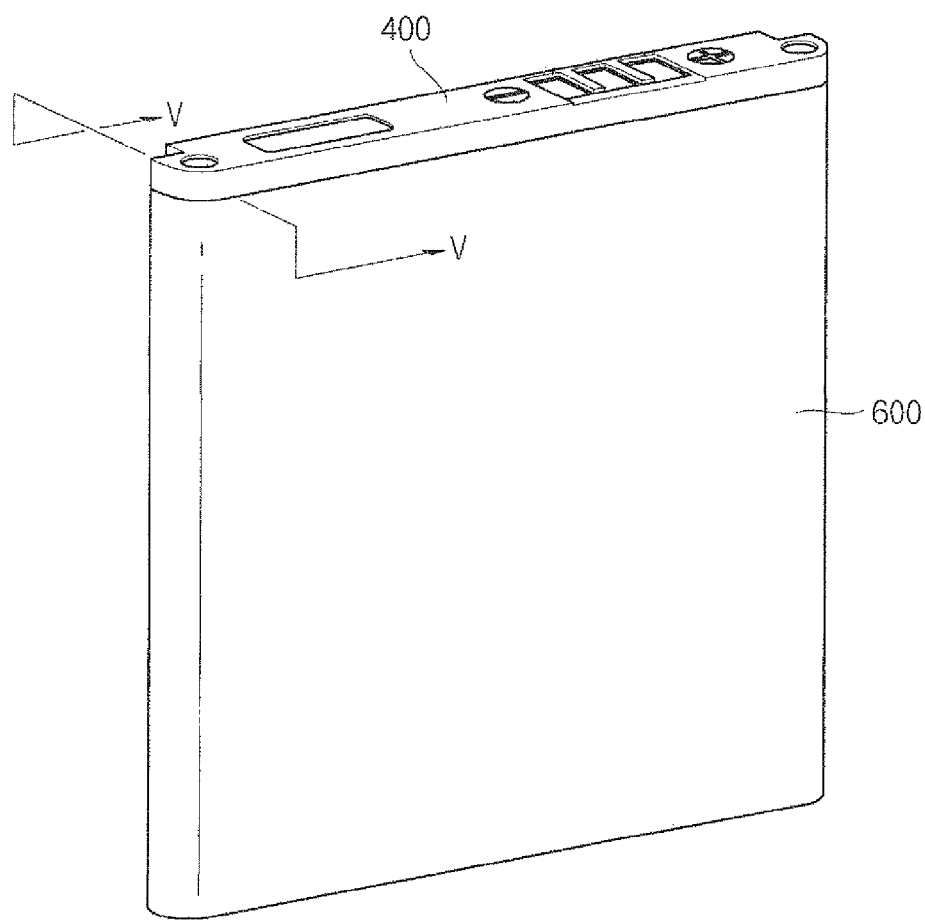
FIG. 4 is a perspective view of a state wherein a label sheet according to the first exemplary embodiment is attached.
Figure 5:
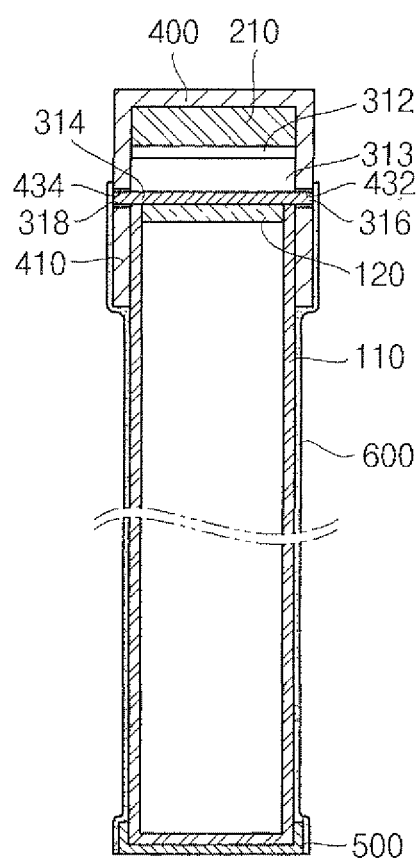
FIG. 5 is a sectional view taken along line V-V of FIG. 4.

FIG. 1 is an exploded perspective view of a rechargeable battery according to a first exemplary embodiment of the present invention, FIG. 2 is a perspective view of a state wherein an upper case of the rechargeable battery according to the first exemplary embodiment of the present invention is combined, FIG. 3 is a sectional view taken along line III-III of FIG. 2, FIG. 4 is a perspective view of a state wherein a label sheet according to the first exemplary embodiment is attached, and FIG. 5 is a sectional view taken along line V-V of FIG. 4.

Referring to FIGS. 1 thru 5, the rechargeable battery includes a bare cell 100, a protection circuit module 200 arranged on one surface of the bare cell 100, and an upper case 400 covering the protection circuit module 200. The protection circuit module 200 further includes a protection circuit board 210, and the bare cell 100 and the protection circuit module 200 are electrically coupled to each other by lead plates 310 and 320.

The upper case 400 is fixed by the lead plates 310 and 320 so as to be combined with the bare cell 100.

A lower case 500 is installed on a lower surface of the bare cell 100, and a label sheet 600 is wound and attached on a side surface of the bare cell 100.

The bare cell 100 includes an electrode assembly (not shown) comprising a cathode plate, an anode plate and a separator, a can 110 receiving the electrode assembly and an electrolytic solution, a cap assembly (not shown) including a cap plate 120 for sealing an opening part of the can 110, and an electrode terminal 130 passing through the cap plate 120 so as to connect the electrode terminal 130 to an electrical terminal (not shown) of the protection circuit board 210.

The protection circuit module 200 is composed of various electronic devices (not shown) installed on the protection circuit board 210. A through-hole 211 is formed in a middle part of the protection circuit board 210, and an electrical terminal connected to the electrode terminal 130 is horizontally installed in parallel with the cap plate 120 and through the through-hole 211.

The lead plates 310 and 320 are installed on respective ends of the upper surface of the cap plate 120. The lead plates 310 and 320 are welded to the protection circuit board 210 and cap plate 120 so as to electrically couple them to each other.

The lead plates 310 and 320 may include substrate fixing parts 312 and 322, bare cell fixing parts 314 and 324, and connecting parts 313 and 323, respectively.

The substrate fixing parts 312 and 322 of the lead plates 310 and 320, respectively, are welded to the protection circuit board 210, the bare cell fixing parts 314 and 324 are welded to the bare cell 100, and the connecting parts 313 and 323 connect the substrate fixing parts 312 and 322 to the bare cell fixing parts 314 and 324. The substrate fixing parts 312 and 322 are formed by bending upper parts of the lead plates 310 and 320, respectively, and the bare cell fixing parts 314 and 324 are formed by bending lower parts of the lead plates 310 and 320, respectively.

The lead plates 310 and 320 are fixed by welding the bare cell fixing parts 312 and 322, respectively, to the upper surface of the cap plate 120. The welding between the bare cell fixing parts 314 and 324 and the upper surface of the cap plate 120 is performed by a laser welding process.

The electrode terminal 130 of the bare cell 100 is electrically coupled to the electrical terminal 220 of the protection circuit board 210. Furthermore, another electrical terminal (not shown) of the protection circuit board 210 is connected to the bare cell by the lead plates 310 and 320. In this regard, when the electrode terminal 130 of the bare cell 100 is connected to the electrical terminal 220 with negative polarity, another electrical terminal of the protection circuit board 210 has positive polarity.

The upper case 400 is combined with the upper part of the bare cell 100 so as to receive the protection circuit board 210. At this point, the upper case 400 is fixed by the lead plates 310 and 320.

The upper case 400 is fixed by projections 316, 318, 326 and 328 formed on the lead plates 310 and 320, respectively, and projection fixing holes 432, 434, 436 and 438 are formed on the upper case 400.

The projections 316, 318, 326 and 328 are horizontally projected from both side surfaces of the bare cell fixing parts 314 and 324 of the lead plates 310 and 320. However, the projections 316, 318, 326 and 328 may be formed on at least one side surface of the bare cell fixing parts 314 and 324. In the case where the projections are formed on any one side surface, it is desirable that when the projection 316 is formed on one side surface of one lead plate 310, the projection 328 be formed on the opposite side surface of the other lead plate 320. This is the reason that it is desirable to fix the upper case 400 by forces simultaneously exerted in directions facing each other.

The upper case 400 includes a sleeve 410 covering an outer circumferential surface of an upper periphery of the bare cell 100 and being extended from a lower end part.

The projection fixing holes 432, 434, 436 and 438 are formed on an upper end of the sleeve 410 of the upper case 400 so as to pass through the sleeve 410.

Thus, when the upper case 400 is combined with the upper part of the bare cell 100, the projections 316, 318, 326 and 328 are inserted into the projection fixing holes 432, 434, 436 and 438, respectively, of the upper case 400. Accordingly, the upper case 400 is fixed by the lead plates 310 and 320.

When the upper case 400 is fixed by the lead plates 310 and 320, a label sheet 600 surrounding the side surface of the bare cell 100 is attached. The label sheet 600 is attached so as to cover the sleeve 410 extended at both lower ends of the upper case 400. Accordingly, the label sheet 600 is attached so as to cover the projection fixing holes 432, 434, 436 and 438, thereby preventing the projection fixing holes 432, 434, 436 and 438 from being exposed to the outside.

On the other hand, lower case 500 may be attached to the lower surface of the bare cell 100 by adhesive or the like. The lower case 500 is combined with a lower surface of the can 110 so as to protect the bare cell 100 from external impacts.

Figure 6:
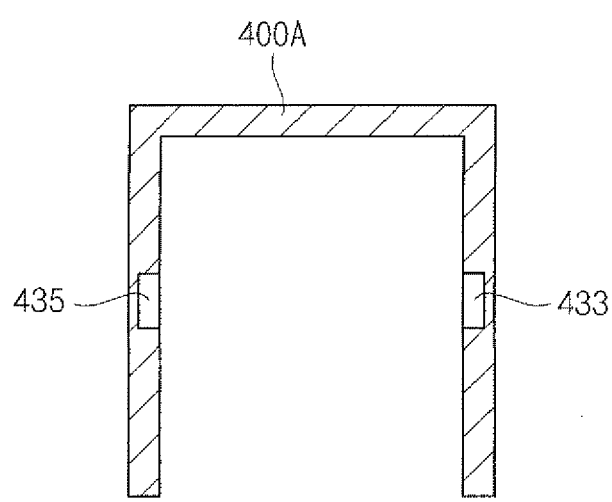
FIG. 6 is a sectional view of the upper case of the rechargeable battery according to a second exemplary embodiment of the present invention.

FIG. 6 is a sectional view of the upper case according to a second exemplary embodiment of the present invention.

Referring to FIG. 6, projection fixing parts may be formed in the shape of a groove on the upper case 400A. That is, projection fixing grooves 433 and 435 are formed inside the upper case 400A and thus projections can be inserted into the upper case 400A and fixed by the projection fixing grooves 433 and 435.

When the projection fixing parts are formed in the shape of groove, it is possible to cover the projections 316, 318, 326 and 328 formed on the lead plates 310 and 320 so as not to be exposed to the outside. Accordingly, even if the label sheet 600 is not attached, the appearance of the rechargeable battery becomes good because the projections 316, 318, 326 and 328 are not exposed to the outside.

Figure 7:
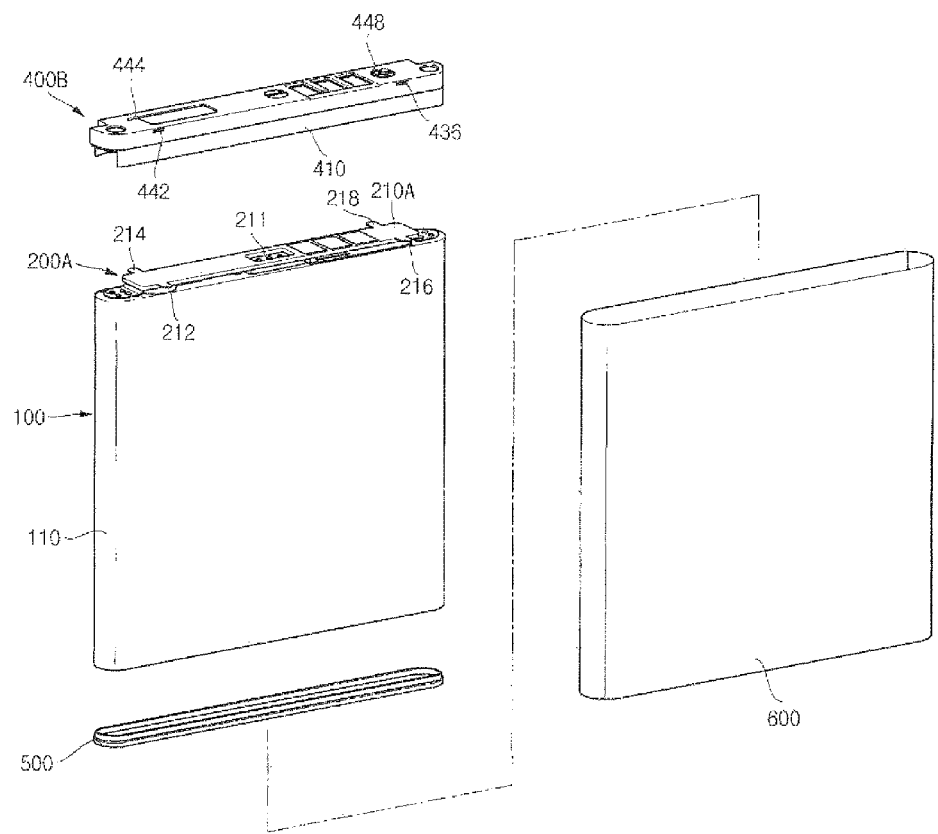
FIG. 7 is an exploded perspective view of a bare cell and the upper case according to a third exemplary embodiment of the present invention.
Figure 8:
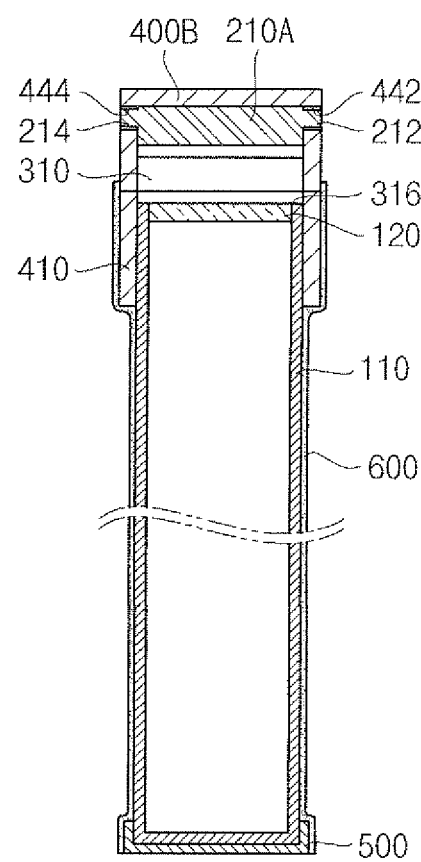
FIG. 8 is a sectional view of a state wherein a label sheet according to the third exemplary embodiment is attached.

FIG. 7 is an exploded perspective view of a bare cell and the upper case according to a third exemplary embodiment of the present invention, and FIG. 8 is a sectional view of a state wherein a label sheet according to the third exemplary embodiment is attached.

In the third embodiment, the same drawing reference numerals are used for the same elements.

Referring to FIGS. 7 and 8, in the rechargeable battery, projections for holding by fixing an upper case 400B to a bare cell 100 are formed on a protection circuit board 210A.

Projections 212, 214, 216 and 218 are respectively formed on both side surfaces of front and rear parts of the protection circuit board 210A outwardly and horizontally. Furthermore, projection fixing holes 442, 444, 446 and 448 are respectively formed at positions of the upper case 400B corresponding to the projections 212, 214, 216 and 218 of the protection circuit board.

In the rechargeable battery constituted as described above, in the process wherein the upper case 400B is assembled on the upper part of the bare cell 100, the projections 212, 214, 216 and 218 of the protection circuit board 210A are inserted into the projection fixing holes 442, 444, 446 and 448 of the case 400B. Thus, the case 400B is fixed to the protection circuit board 210A so as not to be separated from the upper part of the bare cell 100.

After the upper case 400B is assembled, a label sheet 600 may be attached on an outer surface of the bare cell 100. The label sheet 600 is attached so as to cover a sleeve 410 extended at left and right peripheral sides of a lower end of the case 400B, thereby providing a binding force to maintain the upper case 400B fixed to the bare cell 100.

Figure 9:
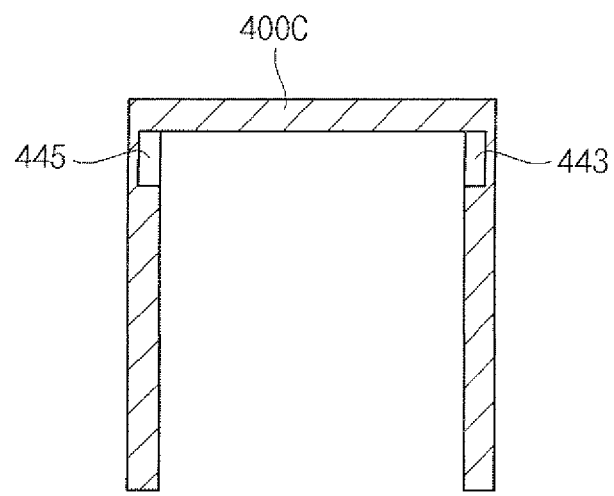
FIG. 9 is a sectional view of an upper case according to a fourth exemplary embodiment of the present invention.

FIG. 9 is a sectional view of the upper case according to a fourth exemplary embodiment of the present invention.

Referring to FIG. 9, the projection fixing part of the upper case may be formed in the shape of a groove. That is, projection fixing grooves 442a and 444a are formed inside an upper case 400C, and thus projections can be inserted into and fixed by the projection fixing grooves 442a and 444a.

When the projection fixing parts are formed in the shape of groove as described above, the projections 212, 214, 216 and 218 formed on the protection circuit board 210A are not exposed to the outside of the upper case 400C. Accordingly, the appearance of the rechargeable battery becomes good.

Figure 10:
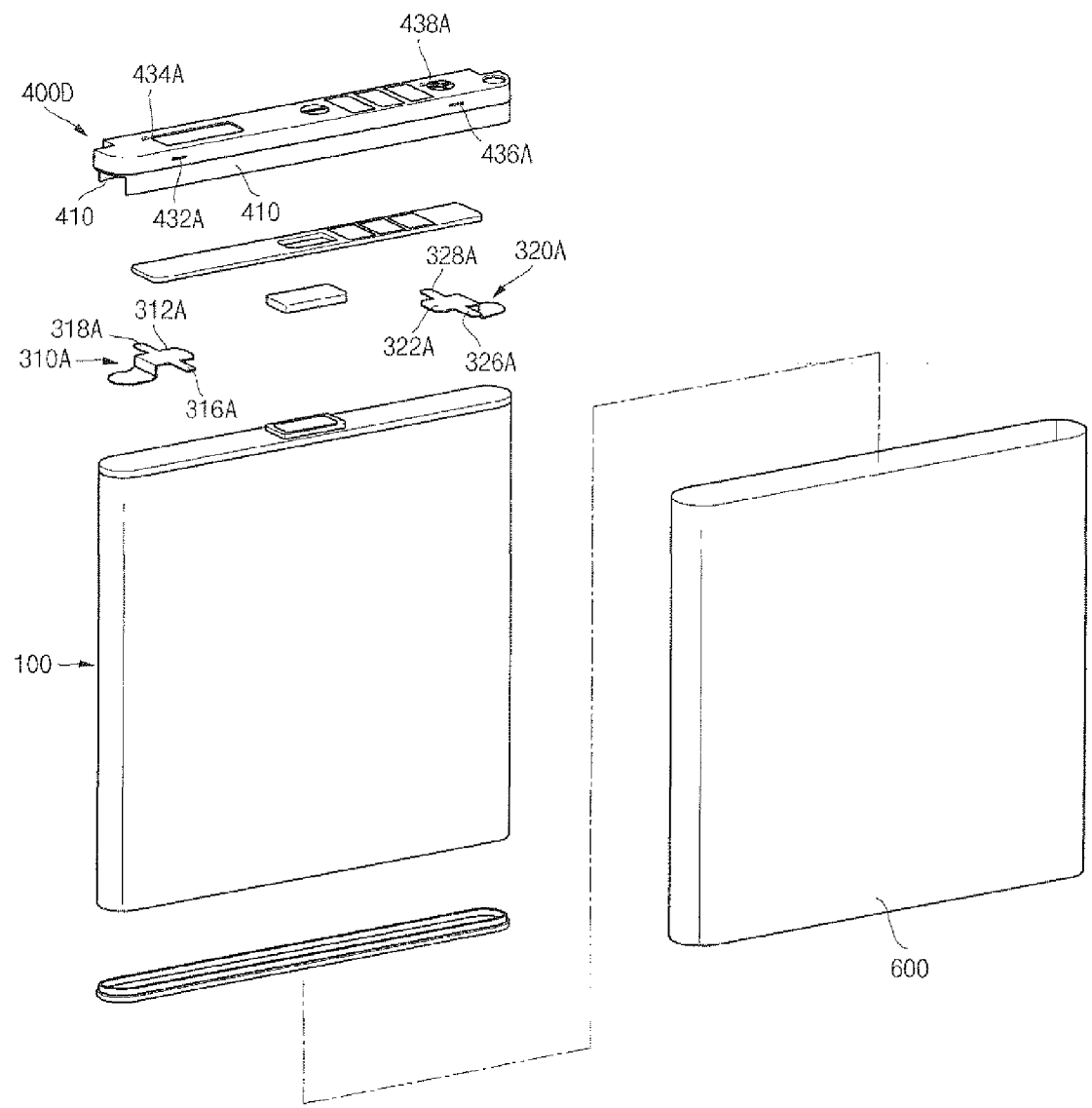
FIG. 10 is an exploded perspective view of a rechargeable battery according to a fifth exemplary embodiment of the present invention.
Figure 11:
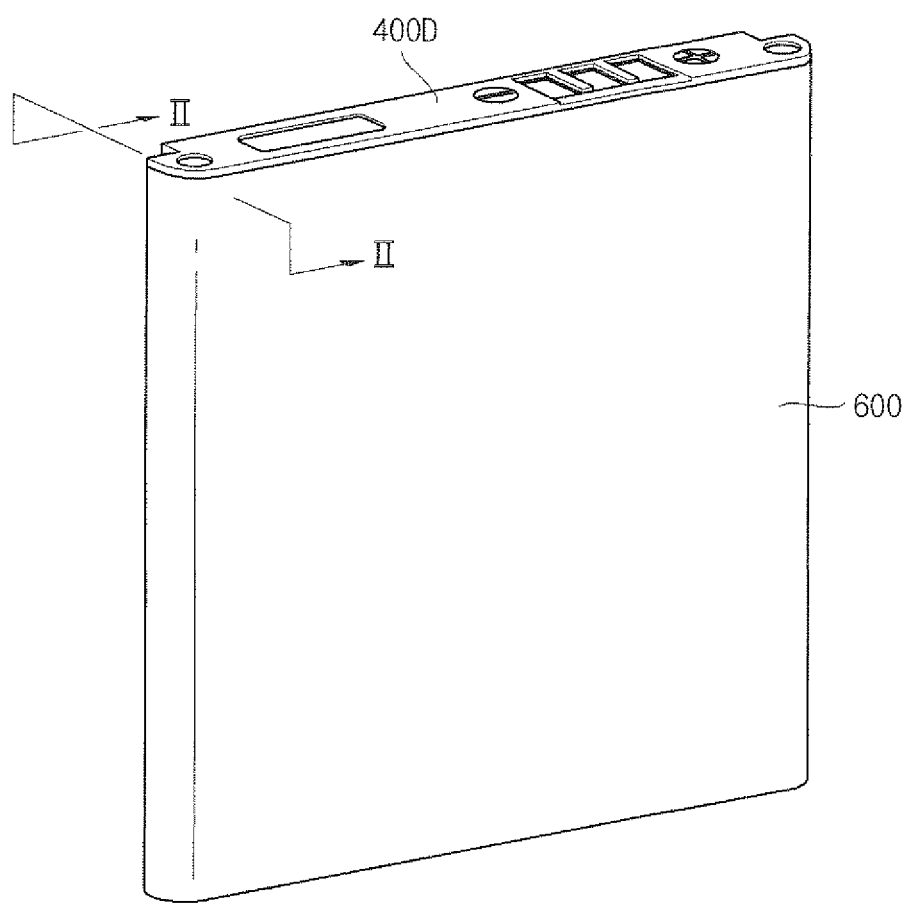
FIG. 11 is a perspective view showing that a label sheet according to the fifth exemplary embodiment is attached to bare cell.
Figure 12:
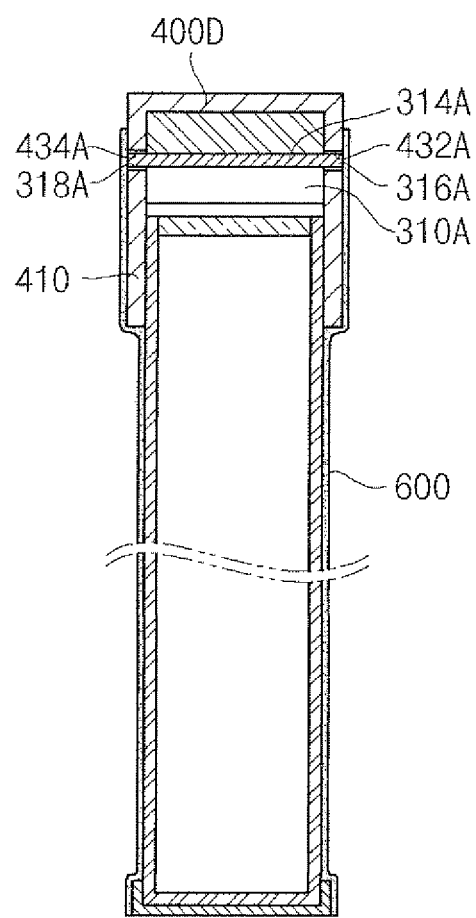
FIG. 12 is a sectional view taken along the line II-II of FIG. 11.

FIG. 10 is an exploded perspective view of a rechargeable battery according to a fifth exemplary embodiment of the present invention, FIG. 11 is a perspective view showing that a label sheet according to the fifth exemplary embodiment is attached to the bare cell, and FIG. 12 is a sectional view taken along the line II-II of FIG. 11.

In the fifth embodiment, the same drawing reference numerals are used for the same elements.

Referring to FIGS. 10 thru 12, in the rechargeable battery, projections for fixing an upper case 400D to a bare cell 100 are formed on substrate fixing parts 312A and 322A of lead plates 310A and 320A.

Projections 316A, 318A, 326A and 328A are horizontally projected from both side surfaces of the substrate fixing parts 312A and 322A, respectively. Projection fixing holes 432A, 434A, 436A and 438A are formed at positions of the upper case 400D corresponding to the projections 316A, 318A, 326A and 328A of the substrate fixing parts 312A and 322A. In the case where the projections are formed on any one side surface of the substrate fixing parts 312A and 322A, it is desirable that, when the projection 316A is formed on one side surface of one lead plate 310A, the projection 328A be formed on the opposite side surface of the other lead plate 320A. This is the reason that it is desirable to fix the upper case 400D by forces simultaneously exerted in the directions facing each other.

In the rechargeable battery constituted as described above, in the process of assembling the upper case 400D to the upper part of the bare cell 100, the projections 316A, 318A, 326A and 328A of the substrate fixing parts 312A and 322A are inserted into the projection fixing holes 432A, 434A, 436A and 438A of the case 400D. Thus, the upper case 400D is fixed to the bare cell 100 by lead plates 310A and 320A to prevent the upper case 400D from being separated from the upper part of the bare cell 100.

After the upper case 400D is assembled, a label sheet 600 may be attached to an outer surface of the bare cell 100 and a side surface of the case 400D including a sleeve 410 extended at left and right peripheral sides of a lower end of the case 400D. Accordingly, the label sheet 600 is attached so as to cover the projection fixing holes 432A, 434A, 436A and 438A, thereby preventing the projection fixing holes 432A, 434A, 436A and 438A from being exposed to the outside.

Figure 13:
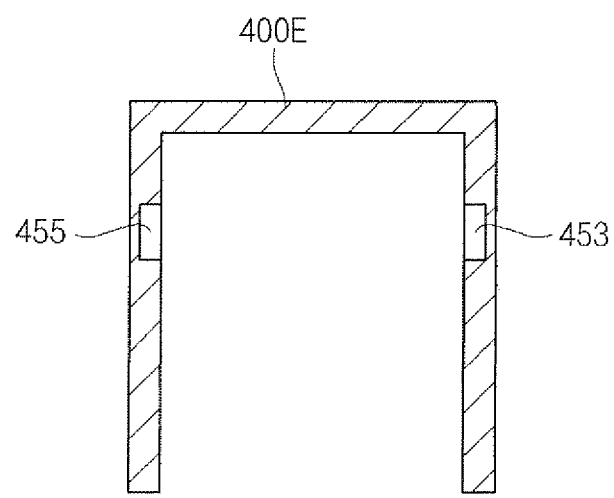
FIG. 13 is a sectional view of the upper case according to a sixth exemplary embodiment of the present invention.

FIG. 13 is a sectional view of the upper case according to a sixth exemplary embodiment of the present invention.

Referring to FIG. 13, the projection fixing part of an upper case may be formed in the shape of a groove. That is, projection fixing grooves 453 and 455 are formed inside an upper case 400E, and thus projections can be inserted into the upper case 400E and fixed by the projection fixing grooves 453 and 455.

When the projection fixing parts are formed in the shape of groove as described above, the projections 316A, 318A, 326A and 328A formed on the substrate fixing parts 312A and 322A are not exposed to the outside of the upper case 400E. Accordingly, the appearance of the rechargeable battery becomes good.

Figure 14:
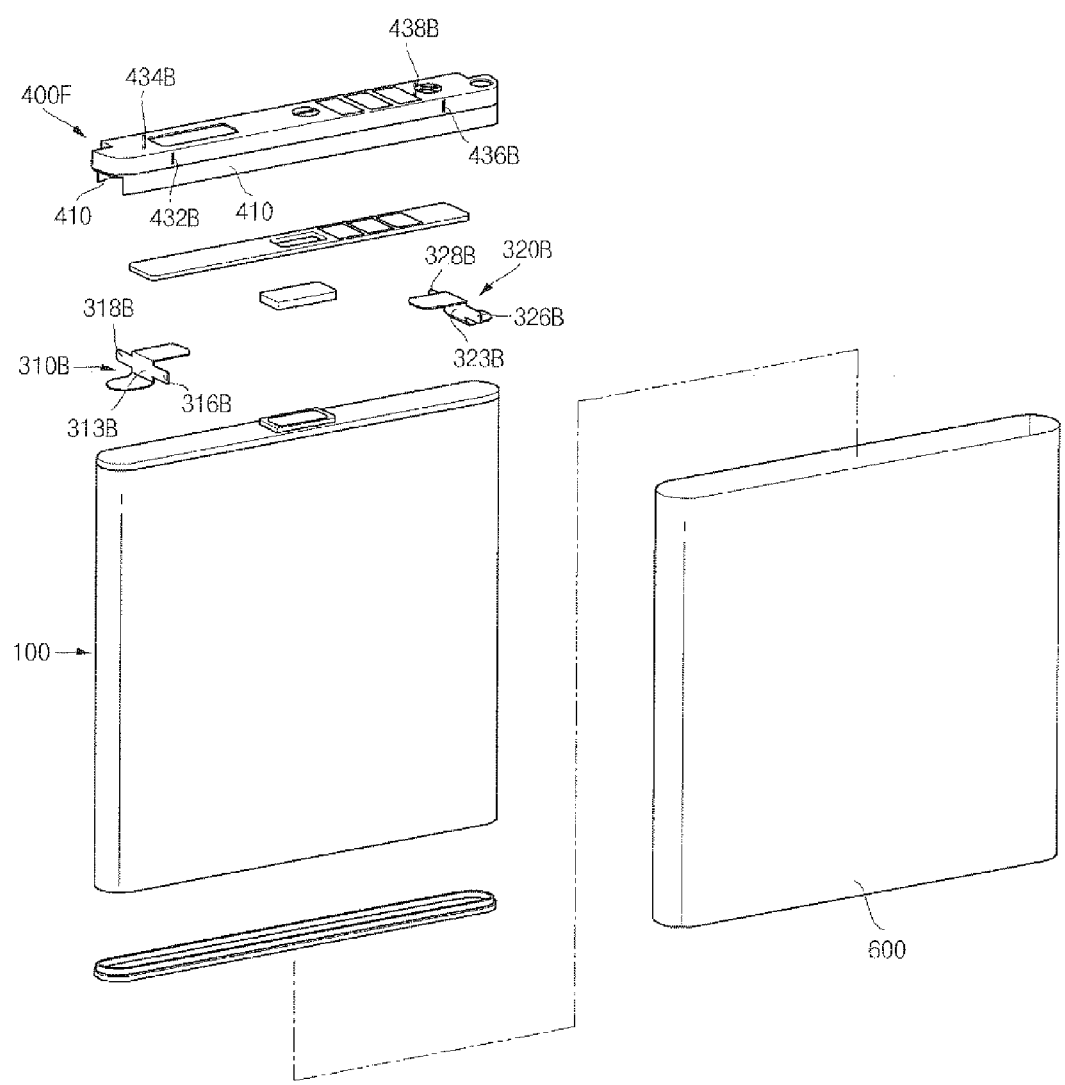
FIG. 14 is an exploded perspective view of a rechargeable battery according to a seventh exemplary embodiment of the present invention.
Figure 15:
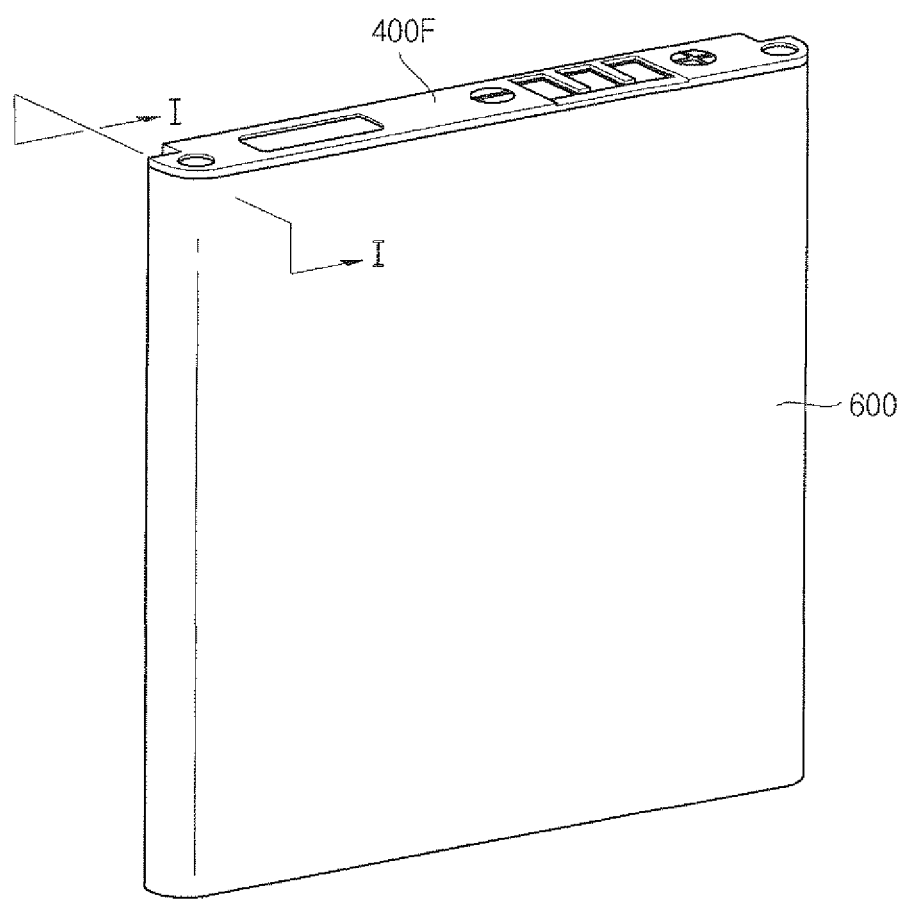
FIG. 15 is a perspective view showing that a label sheet according to the seventh exemplary embodiment is attached.
Figure 16:
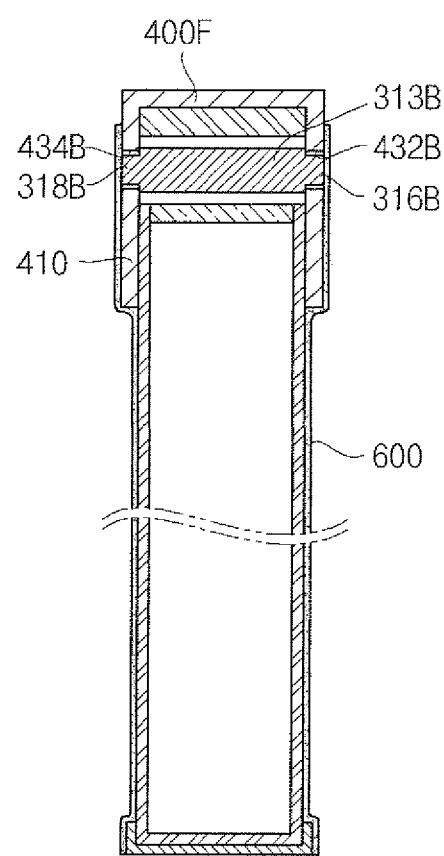
FIG. 16 is a sectional view taken along line I-I of FIG. 15.

FIG. 14 is an exploded perspective view of a rechargeable battery according to a seventh exemplary embodiment of the present invention, FIG. 15 is a perspective view showing that a label sheet according to the seventh exemplary embodiment is attached to the bare cell, and FIG. 16 is a sectional view taken along line I-I of FIG. 15.

In the seventh embodiment, the same drawing reference numerals are used for the same elements.

Referring to FIGS. 14 thru 16, in the rechargeable battery, projections for fixing an upper case 400F to a bare cell 100 are formed on connecting parts 313B and 323B of lead plates 310B and 320B.

Projections 316B, 318B, 326B and 328B are horizontally projected from both side surfaces of the connecting parts 313B and 323B, respectively. Projection fixing holes 432B, 434B, 436B and 438B are formed at positions of the upper case 400F corresponding to the projections 316B, 318B, 326B and 328B of the connecting parts 313B and 323B.

In the case where the projections are formed on any one side surface of the connecting parts 313B and 323B, it is desirable that, when the projection 316B is formed on one side surface of one lead plate 310B, the projection 328B be formed on the opposite side surface of the other lead plate 320B. This is the reason that it is desirable to fix the upper case 400F by forces simultaneously exerted in directions facing each other.

In the rechargeable battery constituted as described above, in the process of assembling the upper case 400F to the upper part of the bare cell 100, the projections 316B, 318B, 326B and 328B of the connecting parts 312B and 322B are inserted into the projection fixing holes 432B, 434B, 436B and 438B of the case 400F. Thus, the upper case 400F is fixed to the bare cell 100 by lead plates 310B and 320B to prevent the upper case 400F from being separated from the upper part of the bare cell 100.

After the upper case 400F is assembled, a label sheet 600 may be attached to an outer surface of the bare cell 100 and a side surface of the case 400F including a sleeve 410 extended at left and right peripheral sides of a lower end of the case 400F. Accordingly, the label sheet 600 is attached so as to cover the projection fixing holes 432B, 434B, 436B and 438B, thereby preventing the projection fixing holes 432B, 434B, 436B and 438B from being exposed to the outside.

Figure 17:
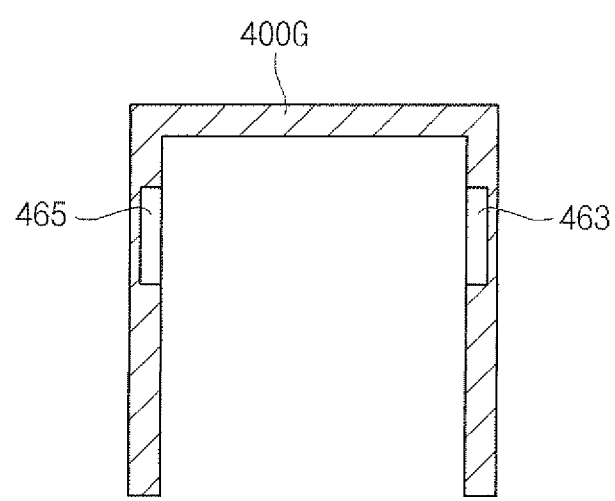
FIG. 17 is a sectional view of the upper case according to an eighth exemplary embodiment of the present invention.

FIG. 17 is a sectional view of the upper case according to an eighth exemplary embodiment of the present invention.

Referring to FIG. 17, projection fixing part of the upper case may be formed in the shape of a groove. That is, projection fixing grooves 463 and 465 are formed inside an upper case 400G, and projections can be inserted into the upper case 400G and fixed by the projection fixing grooves 463 and 465.

When the projection fixing parts are formed in the shape of groove as described above, the projections 316B, 318B, 326B and 328B formed on the connecting parts 312B and 322B are not exposed to the outside of the upper case 400G. Accordingly, the appearance of the rechargeable battery becomes good.

Figure 18:
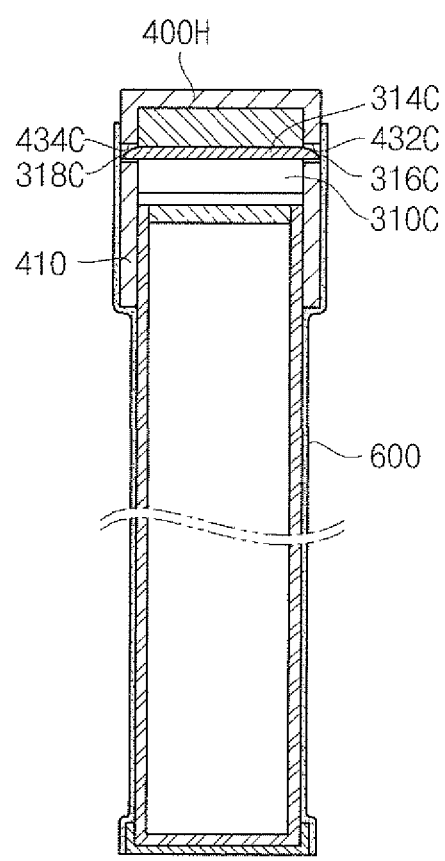
FIG. 18 is a sectional view of a rechargeable battery according to a ninth exemplary embodiment of the present invention.

FIG. 18 is a sectional view of a rechargeable battery according to a ninth exemplary embodiment of the present invention.

Referring to FIG. 18, projections of the lead plates may have one side having a round shape. In an exemplary embodiment, the projections 316C and 318C are provided with one side having a round shape. The projection 316C and 318C are horizontally projected from both side surfaces of the substrate fixing part 314C of the lead plate. Projection fixing holes 432C and 434C are formed at positions of the upper case 400H corresponding to the projections 316C and 318C of the substrate fixing parts 314C. The projections having a round shape may be horizontally projected from the bare cell fixing part or the connecting part.

If the projections 316C and 318C have one side having a round shaped as described above, in the process of assembling the upper case 400H to the upper part of the bare cell 100, the projections 316C and 318C of the substrate fixing parts 314C are easily inserted into the projection fixing holes 432C and 434C of the case 400H. In addition, the upper case 400H is fixed to the bare cell 100 to prevent the upper case 400H from being separated from the upper part of the bare cell 100.

After the upper case 400H is assembled, a label sheet 600 may be attached to an outer surface of the bare cell 100 and a side surface of the case 400H including a sleeve 410 extended at left and right peripheral sides of a lower end of the case 400H. Accordingly, the label sheet 600 is attached so as to cover the projection fixing holes 432C and 434C, thereby preventing the projection fixing holes 432C and 434C from being exposed to the outside.

Figure 19:
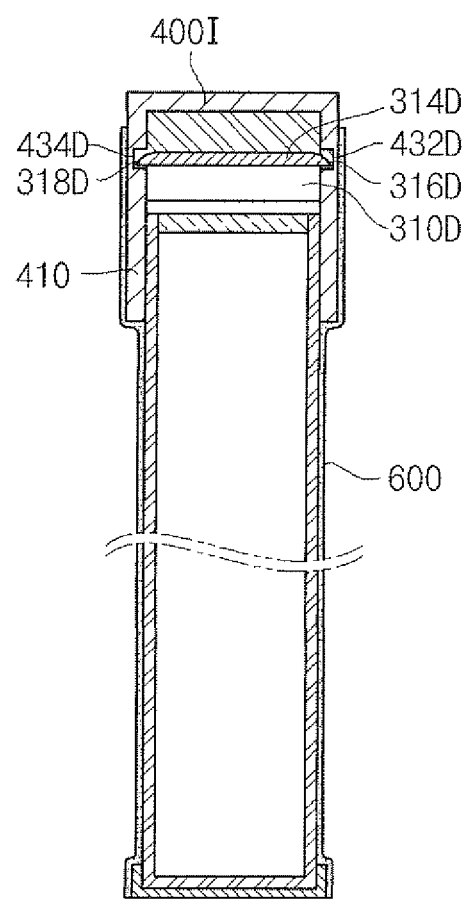
FIG. 19 is a sectional view of a rechargeable battery according to a tenth exemplary embodiment of the present invention.

FIG. 19 is a sectional view of a rechargeable battery according to a tenth exemplary embodiment of the present invention.

Referring to FIG. 19, projection fixing parts of the upper case may be formed in the shape of a groove and projections of the lead plates may have one side having a round shape. That is, projection fixing grooves 432D and 434D are formed inside an upper case 400I, and the projections 316D and 318D can be inserted into the upper case 400I and fixed by the projection fixing grooves 432D and 434D.

When the projection fixing parts are formed in the shape of groove as described above, the projections 316D and 318D formed on the substrate fixing parts 314D are not exposed to the outside of the upper case 400I. Accordingly, the appearance of the rechargeable battery becomes good.

Figure 20:
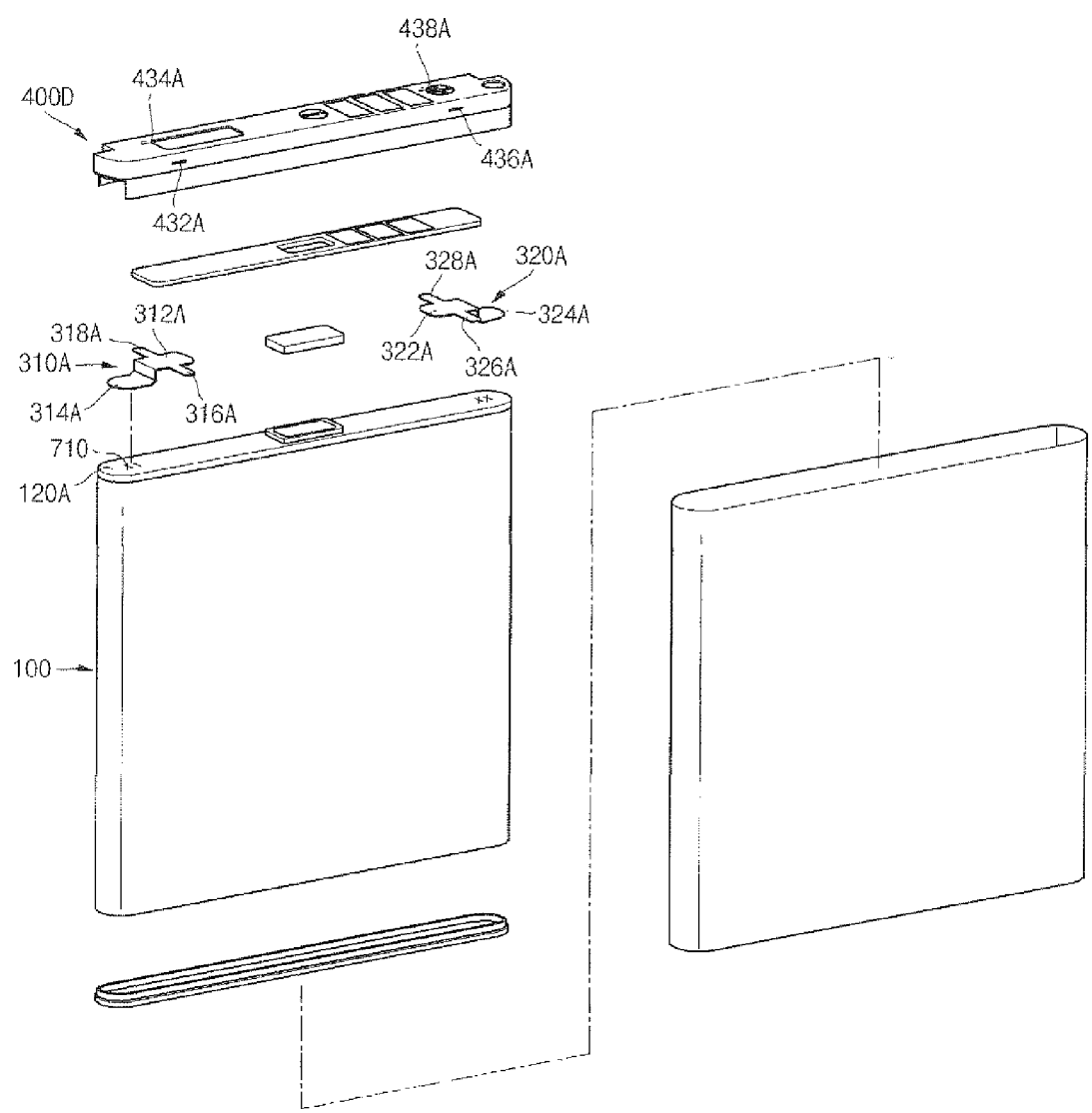
FIG. 20 is an exploded perspective view of a rechargeable battery according to an eleventh exemplary embodiment of the present invention.

FIG. 20 is an exploded perspective view of a rechargeable battery according to an eleventh exemplary embodiment of the present invention.

Referring to FIG. 20, in the rechargeable battery, an alignment means 710 is formed on the surface of a cap plate 120A. When an upper case 400D is combined with the upper part of a bare cell 100, it is important where the lead plates 310A and 320A are positioned on the surface of the cap plate since the protrusion of the lead plate is combined with the protrusion fixing part of the upper case.

The lead plates 310A and 320A are installed on respective ends of the upper surface of the cap plate 120A. The lead plates 310A and 320A are welded to a protection circuit board 210 and cap plate 120A so as to electrically couple them to each other.

Only in a case where bare cell fixing parts of the lead plates 310A and 320A are welded to accurate locations on the upper surface of the cap plate 120A, projections 316A, 318A, 326A and 328A formed on substrate fixing parts 312A and 322A of the lead plates 310A and 320A can be easily inserted into projection fixing holes 432A, 434A, 436A and 438A.

In the eleventh embodiment, an alignment means 710 may be formed on the upper surface of the cap plate 120A for easily finding an accurate welding location of the upper surface of the cap plate 120A when the lead plates 310A and 320A are welded to the upper surface of cap plate 120A. Due to the above alignment means 710, the bare cell fixing parts 314A and 324A of the lead plates 310A and 320A can be fixed accurately to the cap plate 120A.

The alignment means 710 may be a mark including at least one letter or at least one symbol formed on the upper surface of the cap plate 120A.

In the case where the mark used as the alignment means 710 is formed on the upper surface of the cap plate 120A, the accurate welding location of the upper surface of the cap plate 120A can be easily found by confirming the mark. Thus, the bare cell fixing parts 314A and 324A of the lead plates 310A and 320A can be fixed accurately to the cap plate 120A when the lead plates 310A and 320A are welded to the upper surface of cap plate 120A. In this case, the projections 316A, 318A, 326A and 328A formed on substrate fixing parts 312A and 322A of the lead plates 310A and 320A can be easily inserted into projection fixing holes 432A, 434A, 436A and 438A to enable the upper case 400D and the bare cell 100 to be accurately aligned.

Figure 21:
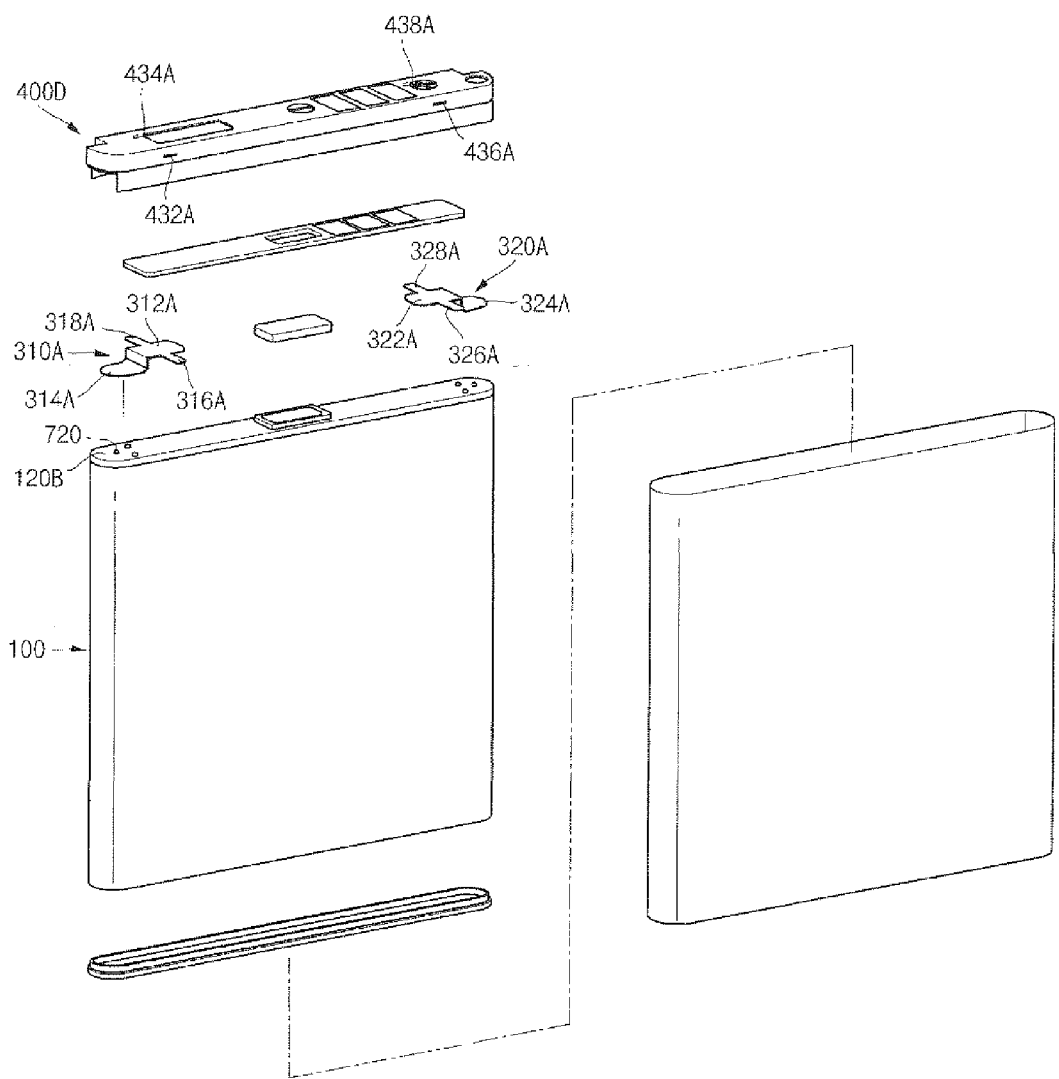
FIG. 21 is an exploded perspective view of a rechargeable battery according to a twelfth exemplary embodiment of the present invention.
Figure 22:
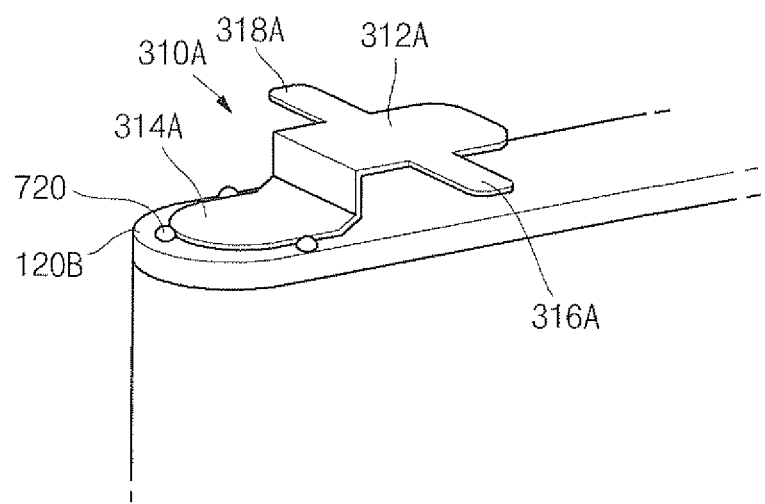
FIG. 22 is a partial enlarged perspective view showing that a lead plate according to the twelfth exemplary embodiment is installed on the upper surface of the cap plate.

FIG. 21 is an exploded perspective view of a rechargeable battery according to a twelfth exemplary embodiment of the present invention, and FIG. 22 is a partial enlarged perspective view showing that a lead plate according to the twelfth exemplary embodiment is installed on end of the upper surface of the cap plate.

Referring to FIGS. 21 and 22, in the rechargeable battery, an alignment means 720 is formed on the surface of a cap plate 120B. The alignment means 720 may be a plurality of dots formed on the upper surface of the cap plate 120B. The alignment means 720 enables lead plates 310A and 320A to be fixed accurately to the cap plate 120B.

When the lead plates 310A and 320A are installed on respective ends of the upper surface of the cap plate 120B, the plurality of dots surrounds sides of the bare cell fixing parts 314A and 324A of the lead plates 310A and 320A. Thus, the bare cell fixing parts 314A and 324A are accurately located on the upper surface of the cap plate 120B so as to be welded to accurate locations on the upper surface of the cap plate 120B. In this case, the projections 316A, 318A, 326A and 328A formed on substrate fixing parts 312A and 322A of the lead plates 310A and 320A can be easily inserted into projection fixing holes 432A, 434A, 436A and 438A to enable the upper case 400D and the bare cell 100 to be accurately aligned.

Figure 23:
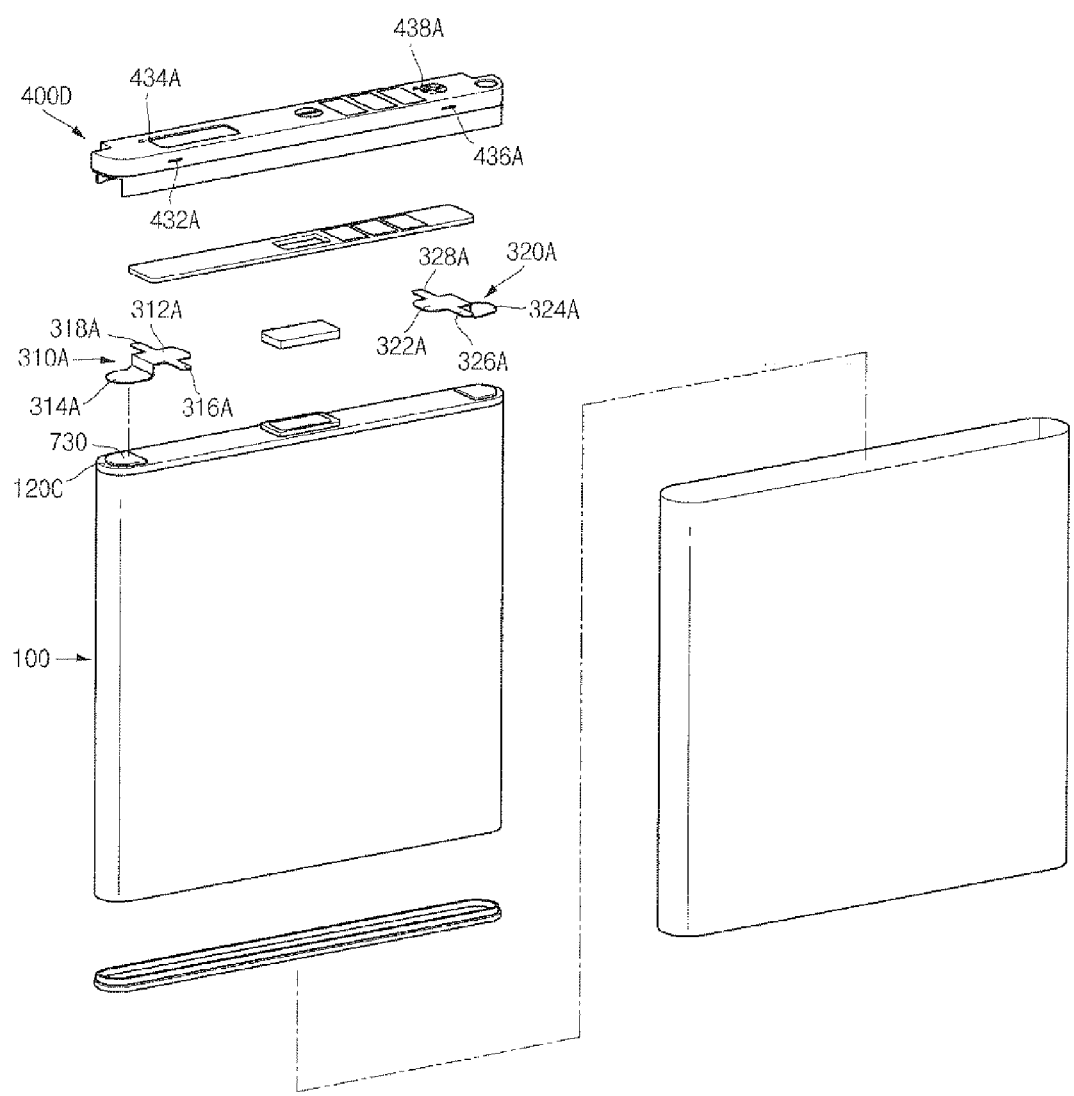
FIG. 23 is an exploded perspective view of a rechargeable battery according to a thirteenth exemplary embodiment of the present invention.
Figure 24:
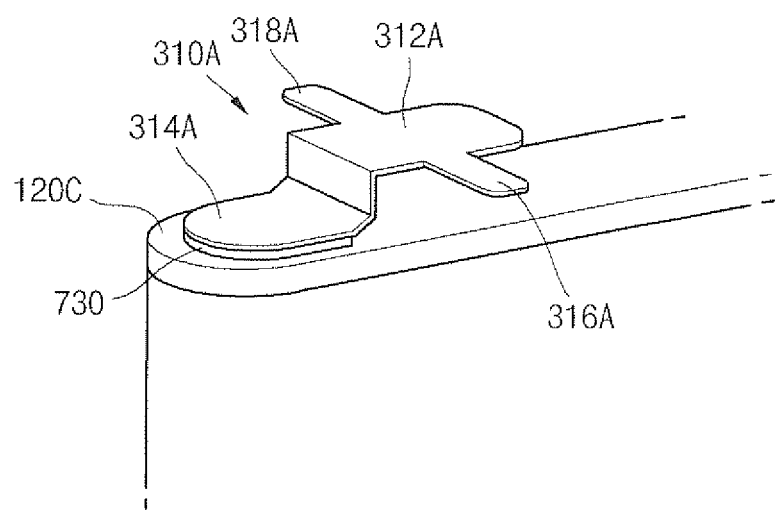
FIG. 24 is a partial enlarged perspective view showing that a lead plate according to the thirteenth exemplary embodiment is installed on the upper surface of the cap plate.

FIG. 23 is an exploded perspective view of a rechargeable battery according to a thirteenth exemplary embodiment of the present invention, and FIG. 24 is a partial enlarged perspective view showing that a lead plate according to the thirteenth exemplary embodiment is installed on end of the upper surface of the cap plate.

Referring to FIGS. 23 and 24, in the rechargeable battery, an alignment means 730 is formed on the surface of a cap plate 120C. The alignment means 730 may be a protrusion having a shape which is substantially the same as that of the bare cell fixing parts 312A and 322A. The alignment means 730 enables lead plates 310A and 320A to be fixed accurately to the cap plate 120C. The protrusion may be formed along a periphery of the bare cell fixing parts 312A and 322A on the cap plate 120c.

When the lead plates 310A and 320A are installed on respective ends of the upper surface of the cap plate 120C, the bare cell fixing parts 314A and 324A of the lead plates 310A and 320A are installed on the upper surface of the protrusion. Thus, the bare cell fixing parts 314A and 324A are accurately located on the upper surface of the cap plate 120C so as to be welded to accurate locations on the upper surface of the cap plate 120C. In this case, the projections 316A, 318A, 326A and 328A formed on substrate fixing parts 312A and 322A of the lead plates 310A and 320A can be easily inserted into projection fixing holes 432A, 434A, 436A and 438A to enable the upper case 400D and the bare cell 100 to be accurately aligned.

Figure 25:
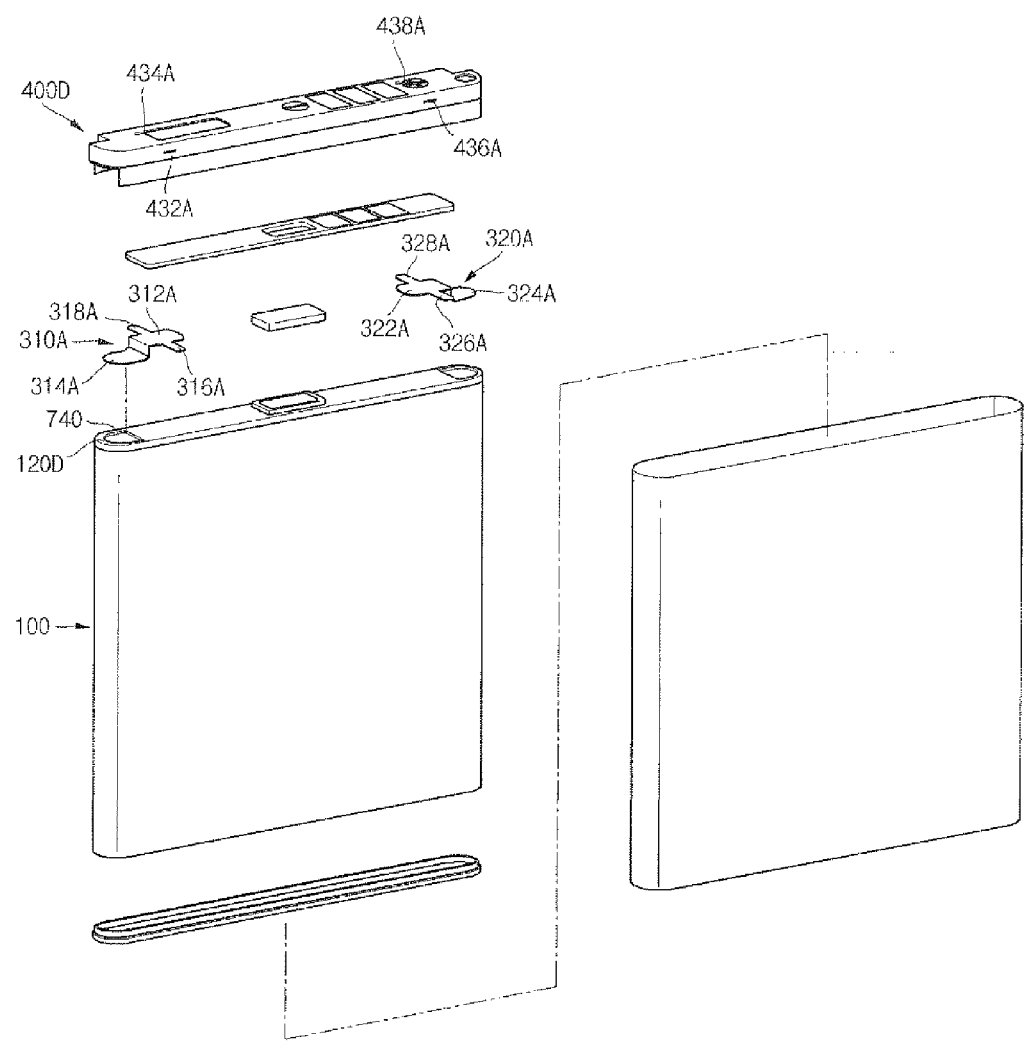
FIG. 25 is an exploded perspective view of a rechargeable battery according to a fourteenth exemplary embodiment of the present invention.
Figure 26:
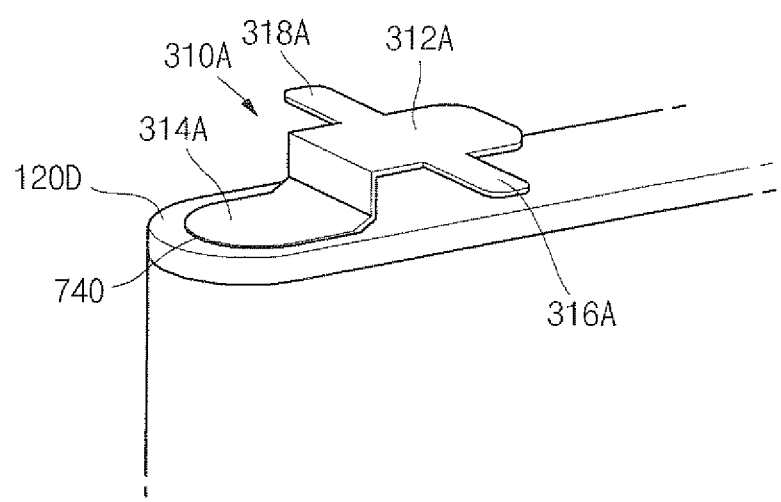
FIG. 26 is a partial enlarged perspective view showing that a lead plate according to the fourteenth exemplary embodiment is installed on the upper surface of the cap plate.

FIG. 25 is an exploded perspective view of a rechargeable battery according to a fourteenth exemplary embodiment of the present invention, and FIG. 26 is a partial enlarged perspective view showing that a lead plate according to the fourteenth exemplary embodiment is installed on end of the upper surface of the cap plate.

Referring to FIGS. 25 and 26, in the rechargeable battery, an alignment means 740 is formed on the surface of a cap plate 120D. The alignment means 740 may be a recess formed on the upper surface of the cap plate 120D, and the recess has a shape such that the bare cell fixing parts 314A and 324A may be received in the recess.

When the lead plates 310A and 320A are installed on respective ends of the upper surface of the cap plate 120D, the bare cell fixing parts 314A and 324A of the lead plates 310A and 320A are received in the recess. Thus, the bare cell fixing parts 314A and 324A are accurately located on the upper surface of the cap plate 120D so as to be welded to accurate locations on the upper surface of the cap plate 120D. In this case, the projections 316A, 318A, 326A and 328A formed on substrate fixing parts 312A and 322A of the lead plates 310A and 320A can be easily inserted into projection fixing holes 432A, 434A, 436A and 438A to enable the upper case 400D and the bare cell 100 to be accurately aligned.

As described above, the rechargeable battery according to the present invention produces the following effects.

First, the case is stably fixed to the bare cell so as not to be separated from the bare cell, thereby improving reliability of products.

Second, the case is fixed by the projection formed on the lead plate, thereby improving the binding force of the case to the bare cell.

Third, the projections are inserted into the projection fixing grooves so as not to be exposed to the outside of the case, thereby allowing the appearance to be good.

Fourth, the case is fixed by a projection formed on the protection circuit board, thereby improving the binding force which binds the case to the bare cell.

Fifth, an align mark is formed on the cap plate, thereby enabling the upper case and the bare cell to be aligned accurately.

It should be understood by those of ordinary skill in the art that various replacements, modifications and changes in form and detail may be made therein without departing from the spirit and scope of the present invention as defined by the following claims. Therefore, it is to be appreciated that the above described embodiments are for purposes of illustration only and are not to be construed as limitations of the invention.

What is claimed is:

1. A rechargeable battery, comprising:
a bare cell including an electrode terminal and a cap plate;
a protection circuit module including a protection circuit board installed on the bare cell and electrically connected to the electrode terminal;
a lead plate, installed between the protection circuit board and the cap plate to electrically couple the protection circuit board and the cap plate, including
a substrate fixing part directly coupled to the protection circuit board,
a bare cell fixing part directly coupled to the cap plate, and
a connecting part having one end directly connecting to the bare cell fixing part and another end directly connecting to the substrate fixing part so that the substrate fixing part does not directly face the bare cell fixing part; and
a case connected to the bare cell to receive the protection circuit module on a surface of the bare cell,
at least one projection formed on the lead plate except the bare cell fixing part, and
a projection fixing part combined with said at least one projection and formed at the case to combine the case with the bare cell.

2. The rechargeable battery of claim 1, wherein said at least one projection is formed on the substrate fixing part.

3. The rechargeable battery of claim 2, wherein said at least one projection extends outwardly in a same major plane of the substrate fixing part from a side surface of the substrate fixing part.

4. The rechargeable battery of claim 1, wherein said at least one projection is formed on the connecting part.

5. The rechargeable battery of claim 4, wherein said at least one projection extends outwardly in same major plane of the connecting part from a side surface of the connecting part.

6. The rechargeable battery of claim 1, wherein the lead plate is fixed by welding the bare cell fixing part to a major flat surface of the cap plate facing outside of the bare cell.

7. The rechargeable battery of claim 6, wherein the major flat surface of the cap plate includes alignment means formed thereon for aligning the bare cell fixing part with the major flat surface of the cap plate.

8. The rechargeable battery of claim 7, wherein the alignment means comprises a mark including one of at least one letter and at least one symbol formed on the major flat surface of the cap plate.

9. The rechargeable battery of claim 7, wherein the alignment means comprises at least one protrusion formed on the major flat surface of the cap plate.

10. The rechargeable battery of claim 9, wherein said at least one protrusion comprises a plurality of dots.

11. The rechargeable battery of claim 9, wherein said at least one protrusion has a shape which is substantially the same as a shape of the bare cell fixing part.

12. The rechargeable battery of claim 7, wherein the alignment means comprises a recess formed on the major flat surface of the cap plate, and the recess has a shape such that the bare cell fixing part may be received in the recess.

13. The rechargeable battery of claim 1, wherein the projection fixing part is a hole.

14. The rechargeable battery of claim 1, wherein the projection fixing part is a groove.

15. The rechargeable battery of claim 1, wherein the case comprises a sleeve extending from an end part of the case and covering an outer circumferential surface of an upper periphery of the bare cell.

16. The rechargeable battery of claim 15, further comprising a label sheet attached to a portion of an outer circumferential surface of the bare cell to cover the projection fixing part.

17. A rechargeable battery, comprising:
a bare cell including an electrode terminal and a cap plate;
a protection circuit module including a protection circuit board installed on the bare cell and electrically connected to the electrode terminal;
a lead plate, installed between the protection circuit board and the cap plate to electrically couple the protection circuit board and the cap plate, including
   a substrate fixing part directly coupled to the protection circuit board,
   a bare cell fixing part directly coupled to a major flat surface of the cap plate facing outside of the bare cell, and
   a connecting part having one end directly connecting to the bare cell fixing part and another end directly connecting to the substrate fixing part so that the substrate fixing part does not directly face the bare cell fixing part; and
a case connected to the bare cell to receive the protection circuit module on a surface of the bare cell,
at least one projection formed on the lead plate except the bare cell fixing part,
a projection fixing part combined with said at least one projection and formed at the case to combine the case with the bare cell, and
an alignment device formed on the major flat surface of the cap plate and aligning the bare cell with the lead plate.

18. The rechargeable battery of claim 17, wherein the alignment device comprises at least one protrusion formed on the major flat surface of the cap plate.

19. The rechargeable battery of claim 17, further comprising a label sheet attached to a portion of an outer circumferential surface of the bare cell to cover the projection fixing part.

20. A rechargeable battery, comprising:
a bare cell including an electrode terminal and a cap plate;
a protection circuit module including a protection circuit board installed on the bare cell and electrically connected to the electrode terminal;
a one-piece lead plate, installed between the protection circuit module and the cap plate to electrically couple the protection circuit module and the cap plate, includes a substrate fixing part formed by bending a first end of the lead plate and directly coupled to the protection circuit board, a bare cell fixing part formed by bending a second end of the lead plate opposite to the first end of the lead plate in an opposite direction and directly coupled to the bare cell, and a connecting part directly connecting the substrate fixing part and the bare cell fixing part;
a case connected to the bare cell to receive the protection circuit module on a surface of the bare cell;
at least one projection formed on the lead plate except the bare cell fixing part; and
a projection fixing part combined with said at least one projection and formed at the case to combine the case with the bare cell.

* * * * *